No. 806,601. PATENTED DEC. 5, 1905.
R. C. TURNER.
APPARATUS FOR STERILIZING MILK AND OTHER LIQUIDS.
APPLICATION FILED MAR. 16, 1904.
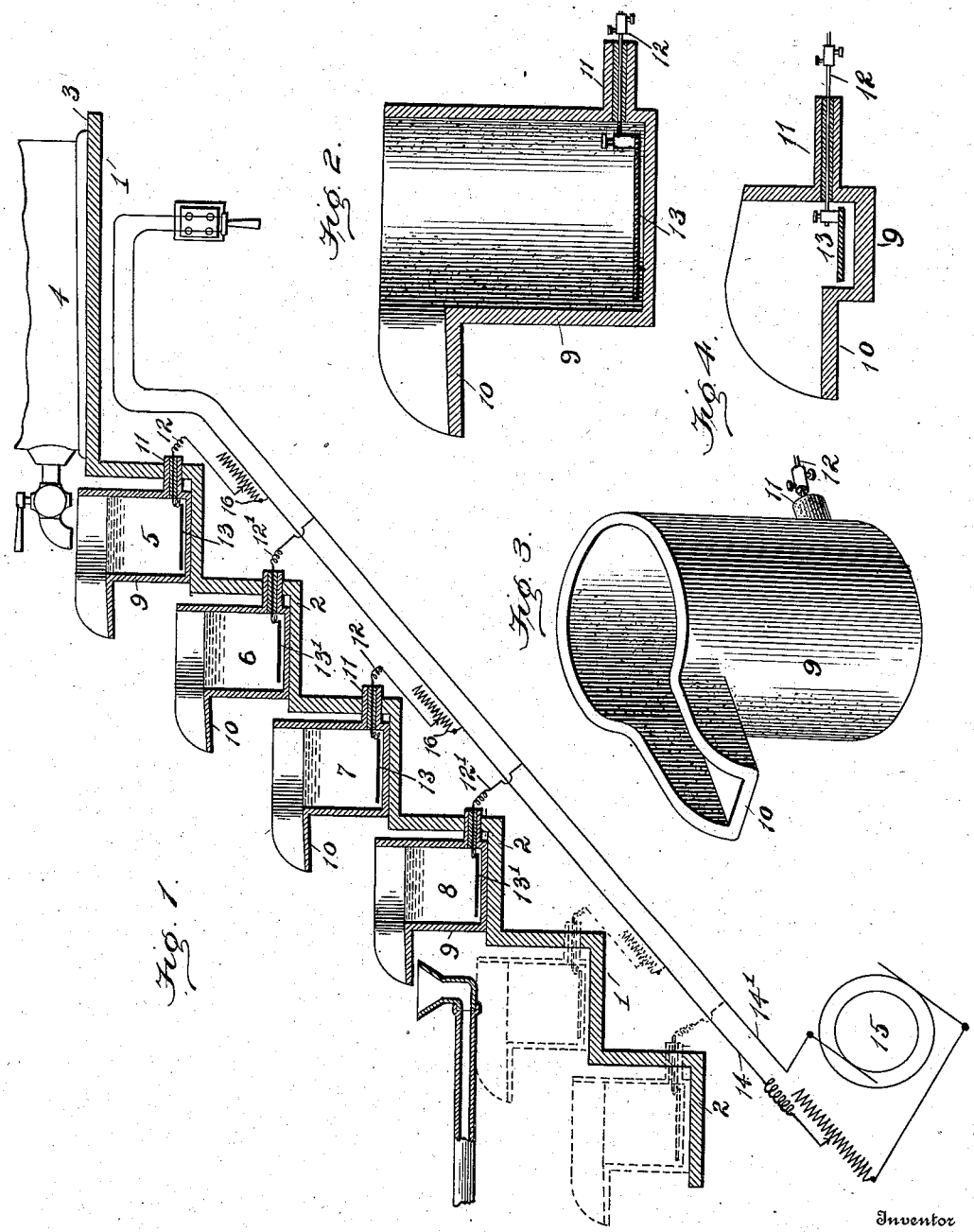
Witnesses
Edwin L. Bradford
Lewis T. Boynton
Inventor
Robert C. Turner
By
H. H. Bliss,
Attorney

UNITED STATES PATENT OFFICE.

ROBERT C. TURNER, OF COLUMBUS, OHIO.

APPARATUS FOR STERILIZING MILK AND OTHER LIQUIDS.

No. 806,601. Specification of Letters Patent. Patented Dec. 5, 1905.

Application filed March 16, 1904. Serial No. 198,504.

*To all whom it may concern:*

Be it known that I, ROBERT C. TURNER, a citizen of the United States, residing at Columbus, in the county of Franklin and State of Ohio, have invented certain new and useful Improvements in Apparatus for Sterilizing Milk and other Liquids, of which the following is a specification, reference being had therein to the accompanying drawings.

This invention relates to an improved apparatus for treating liquids for the purpose of purifying, sterilizing, and otherwise modifying them by the electric current.

Figure 1 is a side view of an apparatus embodying my improvements and more or less conventionally illustrated. Fig. 2 is a vertical section of one of the vessels for holding the liquid during the time of treatment. Fig. 3 shows detached and in perspective one of the vessels used in the process. Fig. 4 is a vertical section of a modified form of vessel for holding the liquid.

In the drawings a supporting-frame 1 is shown, it having the horizontal step-like parts 2 2 and a platform 3. Upon the platform 3 is mounted the initial tank or receptacle 4, which contains the liquid that is to be treated by the apparatus below it.

Inasmuch as I am at present employing the present apparatus and method largely in the treatment of milk, I will herein refer more specifically to that liquid; but I wish it understood that I do not limit the invention thereto.

Upon each of the steps 2 2 there is supported a milk vessel, and while these are substantially similar to each other I have for convenience designated them in the drawings in series as 5, 6, 7, and 8. These are each preferably made of a material which is non-conducting as to electricity and suitable for the holding of the milk or other liquid. Preferably I make them of earthenware, although glass can be substituted, if desired. Each is formed with a main body part 9, adapted to hold a body of milk and also formed with a relatively long spout 10, along and through which the milk flows from an upper vessel to a lower one. These vessels 5 6, &c., are preferably so arranged that the tip of the nozzle or the spout of the upper one shall deliver the milk near the inner wall of the next lower one, so as to insure that the liquid shall circulate as thoroughly as possible through the body parts of all of the vessels in series and prevent it from escaping too quickly from the top of one through its spout to the next lower.

If the vessel 5 be formed of porcelain or earthenware, it is at the time of manufacture provided with a tube or perforated projection 11, extending outward from one of its sides and on horizontal lines near its bottom. Through this is passed the terminal of an electric conductor 12, which terminates in an electrode 13 at the bottom of the interior chamber.

For understanding some of the features of the present invention the series as an entirety 5 6 7 8, &c., of milk vessels may be regarded as divided into sets, each set having two vessels. Thus the vessels at 5 and 6 constitute one set and those at 7 and 8 another, and so on. It will be understood, however, that the number in each set may be varied according to preference or as circumstances may dictate. The vessel 6 of the first set or pair herein is constructed in the manner described for the receptacle 5—that is to say, it has a tube 12 formed therewith having an electric conductor 12' sealed and insulated therein and the electrode 13' in the bottom of its interior.

14 indicates the positive, and 14' the negative, side of an electric circuit connected to any suitable source of supply. I prefer to connect it to means for supplying a powerful alternating current, such as indicated at 15.

With the mains 14 14' the electrodes in the pairs of vessels (5 6 and 7 8, and so on) are connected in multiple, those of each pair being in series with each other—that is to say, the electrode 13 in the vessel 5 is in series with the electrode 13' in the vessel 6; but when they are considered as a pair of vessels, each in series with the other, they both are in multiple with those of the other pairs in the vessels 7 8, and so on. The conductor 12 is connected to the side 14 of the main circuit and the conductor 12' to the side 14'.

The method of operation of the mechanism illustrated will be readily understood. The initial tank or receptacle 4 being supplied with a quantity of milk or liquid to be treated, it is allowed to run therefrom into the upper receptacle 5, and after that is filled it flows through its spout to the next at 6, then from that to the next at 7, and so on through the series, the stream of liquid being continuous. At the same time current being supplied to the circuit 14 14', the electricity travels in multiple paths. It passes, for instance, through the wire 12 to the electrode 13 in the bottom of the first receptacle 5, then upward through the body of the milk therein, thence along the spout 10 and down with the stream into the body of the liquid in the second vessel 6 to the electrode 13', and thence out on the return-wire 12' to the lower side 14' of the main line. Similarly a branch current is passed to and from the electrodes 13 13' in the vessels 7 and 8 and through the bodies of the liquid therein and along the spout of the vessel 7.

As above remarked, the connecting up of the different cells or receptacles with the main line will be varied to suit the different kinds or grades of liquid which pass through the apparatus or to vary the results attained. Instead of coupling them in such way as to have two in a set, which two are electrically in series, they may be connected so as to have three in a set, the entire series in such case being in a multiple of three. Care is to be taken that the electrical resistance in each of the sets is equal. This can be accomplished by having the receptacles uniform in their dimensions and spaced so that the distance between them shall be equal, or it can be accomplished in any way well known to the electrician, as by inserting variable resistances, as indicated at 16, in the electrical circuits for each set of vessels.

Ordinarily in the treatment of common milk I have found that with the arrangement illustrated with the entire series of cells or receptacles divided up into pairs or sets of two, and with the pairs in multiple with the main supply-circuit the best results are attained, provided, of course, the dimensions of the cells are properly related to the strength and quantity of the current delivered. If the path of the milk is too prolonged, excessive heating results, which it is desired to avoid.

The current used being alternating, the well-known results are attained with respect to the destruction of organic life; but I do not wish the novel features of the process or apparatus limited to any particular character of current.

In Fig. 4 I have shown a slightly-modified form of vessel in which the milk is treated. It will be noted that in this form the milk-directing spout 10 is somewhat nearer the electrode 13 than is the case in the other form shown in Figs. 1, 2, and 3. In the modified form the milk remains for a shorter period of time in the vessel, and the proximity of the electrode to the directing-spout insures that the milk which is falling into the vessel will come into close proximity with the electrode therein.

What I claim is—

1. In an apparatus for treating milk and other liquids, the combination of a plurality of liquid receiving and delivering vessels arranged one above the other in series and each having an imperforate bottom wall and a directing-spout adapted to direct liquid overflowing through it in a reduced stream to the next vessel in the series, the said vessels being arranged electrically in pairs, a source of electric power, and means connecting each of said pairs of vessels in multiple arc with said source of power.

2. In an apparatus for treating milk and other liquids, the combination of a plurality of liquid receiving and delivering vessels arranged one above the other in series, each vessel having an imperforate bottom and an overflow-spout arranged to direct the liquid flowing from it to the next vessel in the series, the plurality of electrodes, each arranged in one of said vessels in a horizontal plane beneath said overflow-spout, an electric circuit, and means connecting pairs of electrodes in adjacent vessels in multiple arc in said circuit, the vessels containing said pairs of electrodes each being electrically in series with each other.

3. In an apparatus for treating milk and other liquids, the combination of a series of liquid receiving and delivering vessels arranged one above the other, each provided with a spout adapted to direct liquid to a vessel below it and with an electrode arranged in horizontal planes beneath said spout, an electric circuit, connections between the electrodes in the said vessels and the said circuit adapted to connect sets of the vessels in multiple, the vessels of said sets being electrically in series with each other, and the variable resistance arranged in the circuits of each of said sets.

4. In an apparatus for treating milk and other liquids, the non-conducting and electrically-insulated vessels having imperforate bottoms and arranged to have liquid overflow in a reduced stream falling through the open air from one to the other, an electrode submerged in the liquid body of each vessel and adapted to have an electric current flow from one to the other along the said reduced stream, substantially as set forth.

5. In an apparatus for treating milk and other liquids, a vessel having an imperforate wall and having at a relatively high level means for forming a reduced stream of the overflow liquid, an electrode situated substantially as set forth, whereby it is submerged in the liquid in the vessel and adapted to deliver an electric current to the initial end of said stream in combination with a second electrode arranged to receive the electric current from the opposite end of said stream and conductors for taking current to and from said electrodes respectively, substantially as set forth.

6. In an apparatus of the class described, the combination of the liquid-holding vessel having the body 9, the stream-forming spout 10 with walls extending upward at the sides thereof, the electrode in the lower part of the body 9, the conductor supported on the wall of the vessel and connected to the electrode, substantially as set forth.

7. In an apparatus of the class described, the combination of the upper non-conducting vessel 5, the lower non-conducting vessel 6, each of said vessels having imperforate bottom walls means for delivering liquid from the upper vessel to the lower one in a reduced stream, the electrode in the lower part of the upper vessel, the electrode in the lower part of the lower vessel, the conductors connecting said electrodes to opposite sides of an electric circuit, and means for controlling the quantity of liquid flowing in the said stream, substantially as set forth.

8. In an apparatus of the class described, the combination of the upper non-conducting vessel, the lower non-conducting vessel, means for delivering liquid from the upper to the lower vessel in a reduced stream, an electrode in the lower part of the upper vessel, an electrode in the lower part of the lower vessel, conductors respectively connecting the said electrodes with opposite sides of the electric circuit, and means for varying the electric current passing over the said conductors to the said electrodes, substantially as set forth.

9. In an apparatus of the class described, a non-conducting earthenware vessel having a relatively shallow liquid-holding body part, an elongated horizontally-arranged spout 10, wide deflecting-walls 19, an electrode in the shallow body part, and a conductor extending to points outside of the vessel and permanently attached to and supported by the wall, substantially as set forth.

10. In an apparatus for treating milk and other liquids with electricity, the combination of a plurality of liquid-receiving and delivering vessels arranged one above another in series and each provided with a spout adapted to direct the liquid overflowing from it to the next vessel in the series, a plurality of removable electrodes each arranged in one of said vessels, a source of electric supply, conductors connecting pairs of said electrodes in multiple arc with said source of current-supply, the vessels containing electrodes of each of said pairs being electrically in series with each other, and the variable resistances for varying the electric current passing between the electrodes of each pair.

11. In an apparatus for treating milk and other liquids with electricity, the combination of a plurality of liquid-receiving and delivering vessels arranged one above the other in series and each provided with an approximately horizontal spout adapted to direct the liquid overflowing from it to the next vessel in the series, a plurality of removable electrodes, each arranged in one of said vessels near the bottom thereof, a current-supply circuit, and means connecting the electrodes in adjacent vessels in said series to the opposite sides of said current-supply circuit.

12. In an apparatus for treating milk and other liquids, the combination of a plurality of liquid receiving and delivering vessels arranged one above the other in series, and each provided near its top with an approximately horizontal spout adapted to direct the liquid overflowing from it to the vessel next below it in the series, and a laterally-projecting tube near the bottom of the vessel, the plurality of removable electrodes, each arranged in one of said vessels near the bottom thereof, a current-supply circuit, and the plurality of electrical conductors, each electrically connected at one end to one of said electrodes and extending through the tube carried by the vessel in which said electrode is placed and having its other end connected to one side of said electric circuit, the conductors leading from the electrodes in adjacent vessels in said series being connected to opposite sides of the said current-supply circuit.

13. In an apparatus for treating milk, the combination of two electrically-insulated vessels arranged one above the other, the upper of said vessels having an imperforate bottom wall and an overflow-spout arranged to direct the milk to the lower of said vessels in a reduced stream exposed to the air and an electric conductor for each vessel electrically connected with the liquid therein, said conductor being arranged substantially as set forth to have an electric current flow from one vessel to the other along the said exposed reduced stream.

14. In an apparatus for electrically treating milk, a series of pairs of milk receiving and delivering vessels, one vessel of each pair being adapted to deliver milk to the other one and the latter vessel being adapted to deliver it to one of the vessels of another of said pairs, means for causing the milk to pass in a reduced stream exposed to the atmosphere from each vessel to the next, the plurality of electrodes each arranged in one of said vessels, a source of current-supply, the conductors connecting the electrodes in each of said pairs to the said source of supply substantially as set forth whereby a current of electricity can be caused to pass from one vessel of each pair to the other through the said reduced stream flowing between the said vessels, and the variable resistances arranged in the branch circuits for each of said pairs of vessels.

15. In an apparatus for electrically treating milk, the combination of the series of pairs of milk receiving and delivering vessels, the said vessels being adapted to have a continuous stream of milk pass through them in series, a source of current-supply, the conductors respectively interposed between the said source of current-supply and the liquid in said vessels and adapted to pass an electric current through the liquid in each pair of vessels and along the line of said stream between the vessels of each pair, and the variable resistances in the branch circuits for each pair of vessels.

16. In an apparatus for electrically treating milk or other liquids, the combination of the vertically-stepped frame or support, the series of similar non-conducting vessels each supported by said frame or support at a different level and each adapted to deliver liquid overflowing from it to the next vessel below it, a source of current-supply, the series of electrodes each arranged in one of said vessels, and the conductors connecting each of said electrodes to one side of said current-supply circuit, substantially as set forth whereby the vessels are electrically connected in pairs, the stream of liquid between the vessel of each pair being adapted to complete the electric circuit for said pair of vessels.

17. In an apparatus for electrically treating milk or other liquids, the combination of a plurality of similar non-conducting vessels arranged in series on differing levels and adapted to have the liquid flow from one to the other in a continuous stream, a source of current-supply, conductors extending from the said source of supply to the said vessels and adapted to form with the stream of liquid passing through the vessels a series of electric circuits, and means for providing a uniformity of resistance in the different electric circuits completed by said stream.

18. In an apparatus of the class described, the combination of a series of vessels each one similar to the others, arranged in pairs and adapted to have the milk flow in a continuous stream from one to the next, a source of current-supply, and the electric conductors leading from said source of current-supply each to the interior of one of said cells, and adapted to permit a current to pass through the bodies of liquid in the vessels of each pair independently of the other pairs, the stream of milk flowing from one vessel of each pair to the next being adapted to complete the electric circuit between the cells.

19. In an apparatus for treating milk or other liquids, a plurality of liquid receiving and delivering vessels each similar to the others and arranged in series to have the milk flow in a continuous stream from one to the next, a source of electric-current supply, the plurality of electrodes each arranged within one of said vessels, and the conductors electrically connecting the series of electrodes with source of supply substantially as set forth, whereby sets of the said vessels are connected electrically in series, the streams of liquid flowing from one to the other vessel of each set being adapted to complete the circuit for said set, and the sets being connected in the circuit in multiple arc.

In testimony whereof I affix my signature in presence of two witnesses.

ROBERT C. TURNER.

Witnesses:
   CHARLES R. MAYERS,
   C. B. WOLFE.